(12) United States Patent
Barth et al.

(10) Patent No.: US 8,779,939 B2
(45) Date of Patent: Jul. 15, 2014

(54) METHOD FOR ASSISTING A DRIVER OF A VEHICLE WHEN PARKING IN A PARKING SPACE

(75) Inventors: Harald Barth, Korntal-Munchingen (DE); Nicolas Jecker, Esslingen (DE)

(73) Assignees: VALEO Schalter und Sensoren GmbH, Bietigheim-Bissingen (DE); Volkswagen Aktiengesellschaft, Wolfsburg (DE)

( * ) Notice: Subject to any disclaimer, the term of this patent is extended or adjusted under 35 U.S.C. 154(b) by 121 days.

(21) Appl. No.: 12/995,684

(22) PCT Filed: Jun. 2, 2009

(86) PCT No.: PCT/EP2009/003943
§ 371 (c)(1),
(2), (4) Date: Dec. 2, 2010

(87) PCT Pub. No.: WO2009/149847
PCT Pub. Date: Dec. 17, 2009

(65) Prior Publication Data
US 2011/0087406 A1 Apr. 14, 2011

(30) Foreign Application Priority Data
Jun. 11, 2008 (DE) .......................... 10 2008 027 779

(51) Int. Cl.
*B60Q 1/48* (2006.01)
*B60S 9/00* (2006.01)
*G08G 1/14* (2006.01)

(52) U.S. Cl.
CPC ... *B60Q 1/48* (2013.01); *B60S 9/00* (2013.01); *G08G 1/14* (2013.01)
USPC .......... 340/932.2; 340/425.5; 701/1; 701/41; 180/199; 180/204

(58) Field of Classification Search
USPC .................. 701/41, 1; 340/932.3, 943, 425.5, 340/932.2; 180/199, 204
See application file for complete search history.

(56) References Cited

U.S. PATENT DOCUMENTS 4,931,930 A * 6/1990 Shyu et al. ...................... 701/36
5,742,141 A * 4/1998 Czekaj ........................... 318/587
(Continued)

FOREIGN PATENT DOCUMENTS

DE 43 33 112 A1 3/1995
DE 10 2004 001428 A1 8/2005
(Continued)

OTHER PUBLICATIONS

International Search Report w/translation from PCT/EP2009/003943 dated Sep. 25, 2009 (6 pages).

*Primary Examiner* — Thomas Tarcza
*Assistant Examiner* — Tyler J Lee
(74) *Attorney, Agent, or Firm* — Osha Liang LLP

(57) ABSTRACT

A method for assisting a driver of a vehicle when parking in a parking space is disclosed. The method involves measuring a possible parking space, calculating a parking trajectory on the basis of a current parking space geometry determined from the measurement of the parking space and on the basis of a vehicle position relative to the parking space, and a parking process is subsequently carried out during which the vehicle is steered along the parking trajectory into the parking space, continuing to determine, during the parking process, the current parking space geometry and is compared with a previous parking space geometry determined before the start of the parking process, where, if the two parking space geometries differ from one another, a deviation which is present is evaluated and the parking trajectory corrected and/or re-calculated.

23 Claims, 3 Drawing Sheets

(56) References Cited

U.S. PATENT DOCUMENTS

| | | | |
|---|---|---|---|
| 6,929,082 B2 * | 8/2005 | Kataoka et al. | 180/204 |
| 7,205,905 B2 * | 4/2007 | Gotzig et al. | 340/932.2 |
| 7,706,944 B2 * | 4/2010 | Tanaka et al. | 701/41 |
| 7,786,896 B2 * | 8/2010 | Schmid et al. | 340/932.2 |
| 7,903,842 B2 * | 3/2011 | Satonaka | 382/104 |
| 8,081,539 B2 * | 12/2011 | Faber et al. | 367/98 |
| 8,111,287 B2 * | 2/2012 | Okamoto et al. | 348/118 |
| 8,115,653 B2 * | 2/2012 | Scherl et al. | 340/932.2 |
| 2005/0035879 A1 * | 2/2005 | Gotzig et al. | 340/932.2 |
| 2007/0075875 A1 * | 4/2007 | Danz et al. | 340/932.2 |
| 2010/0259420 A1 * | 10/2010 | Von Reyher et al. | 340/932.2 |
| 2010/0283634 A1 * | 11/2010 | Krautter et al. | 340/932.2 |

FOREIGN PATENT DOCUMENTS

| | | |
|---|---|---|
| DE | 10 2005 046827 A1 | 4/2006 |
| DE | 10 2007 055389 A1 | 5/2009 |
| EP | 1 602 530 A1 | 12/2005 |

* cited by examiner

METHOD FOR ASSISTING A DRIVER OF A VEHICLE WHEN PARKING IN A PARKING SPACE

BACKGROUND OF THE INVENTION

The invention relates to a method for assisting a driver of a vehicle when parking in a parking space according to the preamble of Claim 1, a driver assistance device according to the preamble of Claim 19 and a computer program product according to the preamble of Claim 21.

Known driver assistance devices for assisting a driver of a vehicle when parking in a parking space, referred to below for short as parking systems, calculate, at the start or before the start of a parking process, a path for the parking of the vehicle, referred to as the parking trajectory. This path is calculated on the basis of the parking space geometry and of a vehicle position relative to this parking space. In this context, a parking system measures, with a measuring device which comprises suitable sensors, these being ultrasonic sound sensors (ultrasonic park assist sensors; UPA sensors) which are mounted, for example, at the front and/or rear of the vehicle and/or to the side of the vehicle, a possible parking space, calculated from the parking space data and the parking space geometry obtained therefrom, the parking trajectory and subsequently carries out the parking process by steering the vehicle along the parking trajectory into the parking space, for example by active steering intervention or by driving instructions to the driver. During the parking process, the distance from objects which bound the parking space is monitored by the sensors.

Current parking systems freeze the calculated path before and at the start of the parking process. Furthermore, currently used measuring devices for sensing the parking space geometry have a variation which can act disadvantageously on the parking result, i.e. on the placing of the vehicle, achieved at the end of the parking process, in a target position or in a target orientation in the parking space.

SUMMARY OF THE INVENTION

It can therefore be considered an object of the invention to develop a method for assisting a driver of a vehicle when parking in a parking space, which method permits a satisfactory parking result independently of the variation of a measuring device used and independently of a parking space geometry which is possibly sensed in an insufficient way.

The object is achieved by means of a method for assisting a driver of a vehicle when parking in a parking space, in which method a possible parking space is measured, and a vehicle position relative to the parking space is preferably determined at the same time, a parking trajectory is calculated on the basis of the parking space geometry which is determined from the measurement of the parking space, and on the basis of a vehicle position relative to the parking space, and a parking process is subsequently carried out during which the vehicle is steered along the parking trajectory into the parking space.

According to the invention there is provision for the parking space geometry to continue to be determined during the parking process on the basis of current sensor data which are acquired by a suitable sensor system for measuring the parking space, and for said parking space geometry to be compared with the parking space geometry determined before the start of the parking process, wherein, if the two parking space geometries differ from one another, a deviation which is present is evaluated and the parking trajectory is, if appropriate, corrected and/or re-calculated.

By means of the invention, information which is first determined during the parking process and in that case with improved accuracy may be converted to a usable form and therefore contribute to improving the parking result, in particular in difficult situations, and thus ultimately to improving the usability and customer satisfaction of a parking system.

The method according to the invention has, compared to the prior art, the advantage that if sensor data are present during the parking process which permit better placing of the target position/target orientation of the vehicle in the parking space, said method permits corresponding correction of the parking trajectory. The method according to the invention therefore provides the possibility of a path correction during the parking phase or a correction of the parking trajectory during the parking process on the basis of current, and therefore more accurate, sensor data.

The steering of the vehicle along the parking trajectory can be implemented as guided parking or as semi-automatic parking or as fully automatic parking.

One advantageous refinement of the invention provides that if the difference between the parking space geometry determined before the parking process and that determined during the parking process is small, and for example lies within the respective system-conditioned variation, the original parking space geometry and therefore the parking trajectory calculated before the start of the parking process is retained, and if the parking space geometry determined during the parking process differs significantly from the originally determined parking space geometry and this difference is relevant for the parking result, the parking trajectory is re-defined or corrected on the basis of the parking space geometry currently determined during the parking process.

Another advantageous refinement of the invention provides that the distance from objects which bound the parking space is monitored, for example by means of a suitable sensor system or by means of suitable sensors, during the parking process.

One particularly advantageous refinement of the invention provides that a comparison between the parking space geometry determined before the parking process and that determined during the parking process is carried out by sensing, during the entry into the parking space, the lateral distance, to the left and right of the vehicle, from objects which bound the parking space and by comparing said lateral distance with the distances which are expected on the basis of the originally sensed parking space geometry and the current vehicle position.

It is also conceivable that a comparison between the parking space geometry determined before the parking process and that determined during the parking process is carried out by sensing, during the entry into the parking space, the profile, to the left and right of the vehicle, of objects which bound the parking space, wherein, if it can be detected on the basis of the profile that the parking space has an orientation which differs from the parking space geometry determined before the parking process or form the original definition, the parking trajectory is correspondingly corrected.

In order to determine the orientation of the parking space, the profile of the two lateral objects is preferably represented in each case as a straight line. If both straight lines extend approximately in parallel, the mean value of the two straight lines is preferably adopted as the orientation of the parking space.

In the event of a deviation of the profile of the measured straight lines from the real straight lines, lateral distance data can be used to correct the parking trajectory during the parking process, for example by means of ultrasonic sound sensors which are mounted laterally on the rear bumper. In the event of parallel displacement of the straight lines, the parking trajectory can be corrected with the evaluation of these ultrasonic sound sensors essentially by corresponding parallel displacement. In contrast, in the event of a directional offset of the straight lines, the target angle of the parking trajectory can be corrected with the ultrasonic sound sensors which are mounted laterally on the rear bumper.

If both straight lines do not extend sufficiently in parallel but have the same orientation with respect to the original target orientation, the straight line which differs the least from the original target orientation is preferably adopted as the orientation of the parking space. If both straight lines do not extend sufficiently in parallel and are oriented differently with respect to the original target orientation, a mean value of the two straight lines is preferably adopted as the orientation of the parking space. If both straight lines do not extend sufficiently in parallel and are oriented differently with respect to the original target orientation, the original target orientation is preferably retained. Advantages of these refinements of the method according to the invention are that as a result it is possible not only to park in parking spaces which are oriented virtually at a right angle to the carriageway but also in what are referred to as oblique parking spaces.

One advantageous refinement of the invention provides that, in order to determine the parking space geometry during the parking process, a measuring device is provided which is primarily provided for assisting the driver of the vehicle in a situation other than that during a parking process.

Alternatively, in order to determine the parking space geometry during the parking process, a measuring device is provided which is provided specially for assisting the driver of the vehicle during a parking process.

The measuring device can comprise ultrasonic sound sensors installed in the vehicle, for example additional lateral ultrasonic sound sensors in the rear part of the vehicle and/or a camera which is present in the vehicle, for example a reversing camera and/or radar sensors, for example a sensor system for monitoring the blind spot.

One particularly advantageous refinement of the invention provides that, in order to determine the parking space geometry before and/or during the parking process, parking space markings are captured, for example, by a reversing camera and detected, for example, by means of suitable image processing, wherein the position and orientation of the parking space markings are determined. Since these parking space markings are generally located in the edge region of a camera image before the start of the parking process, determination only becomes appropriate during the parking process, but at least the accuracy of the determination is improved if the parking space marking migrates in the direction of the centre of the image during the parking process. This applies in particular to adverse light conditions and/or contrast conditions.

Another particularly advantageous embodiment of the invention provides that, in order to determine the parking space geometry before and/or during the parking process, a profile of the kerb is sensed and/or determined, for example on the basis of distance data and/or visually, for example by means of a camera.

A further particularly advantageous refinement of the invention provides that there is additionally provision for the target parking position and/or orientation in the parking space to be verified and confirmed or corrected by the driver, for example by means of a representation of the parking situation on a display. This may be done, for example, by superimposing, for example on an image of the reversing camera, a target parking position which is determined by the system.

The invention can advantageously be applied in particular in conjunction with a driver assistance device for assisting the driver of a vehicle when parking in a parking space. Such a driver assistance device preferably comprises:

means for measuring a parking space before and during a parking process, a microprocessor which is connected to the means and has associated storage means for calculating and/or correcting a parking trajectory on the basis of the parking space geometries which are determined from the measurement of the parking space before and during the parking process, and on the basis of a vehicle position relative to the parking space, wherein the microprocessor with associated storage means compares the parking space geometry determined during the parking process with the parking space geometry determined before the start of the parking process, and if the two parking space geometries differ from one another a difference which is present is evaluated and the parking trajectory is, if appropriate, corrected and/or recalculated, and means for carrying out the parking process during which the vehicle is steered along the parking trajectory into the parking space.

One advantageous application of the method according to the invention arises in conjunction with a driver assistance device which permits guided parking or semi-automatic parking or fully automatic parking of a vehicle along the parking trajectory into the parking space.

One particularly advantageous refinement of the invention relates to a computer program product stored on a computer-compatible medium, comprising computer-readable program means which, when the computer program product is executed on a microprocessor with associated storage means or on a computer, cause the latter to carry out a method according to the invention as described above.

BRIEF DESCRIPTION OF THE DRAWINGS

Exemplary embodiments of the invention are illustrated in the figures of the drawing and will be explained in more detail below. In said drawings.

DETAILED DESCRIPTION

Figure 1:
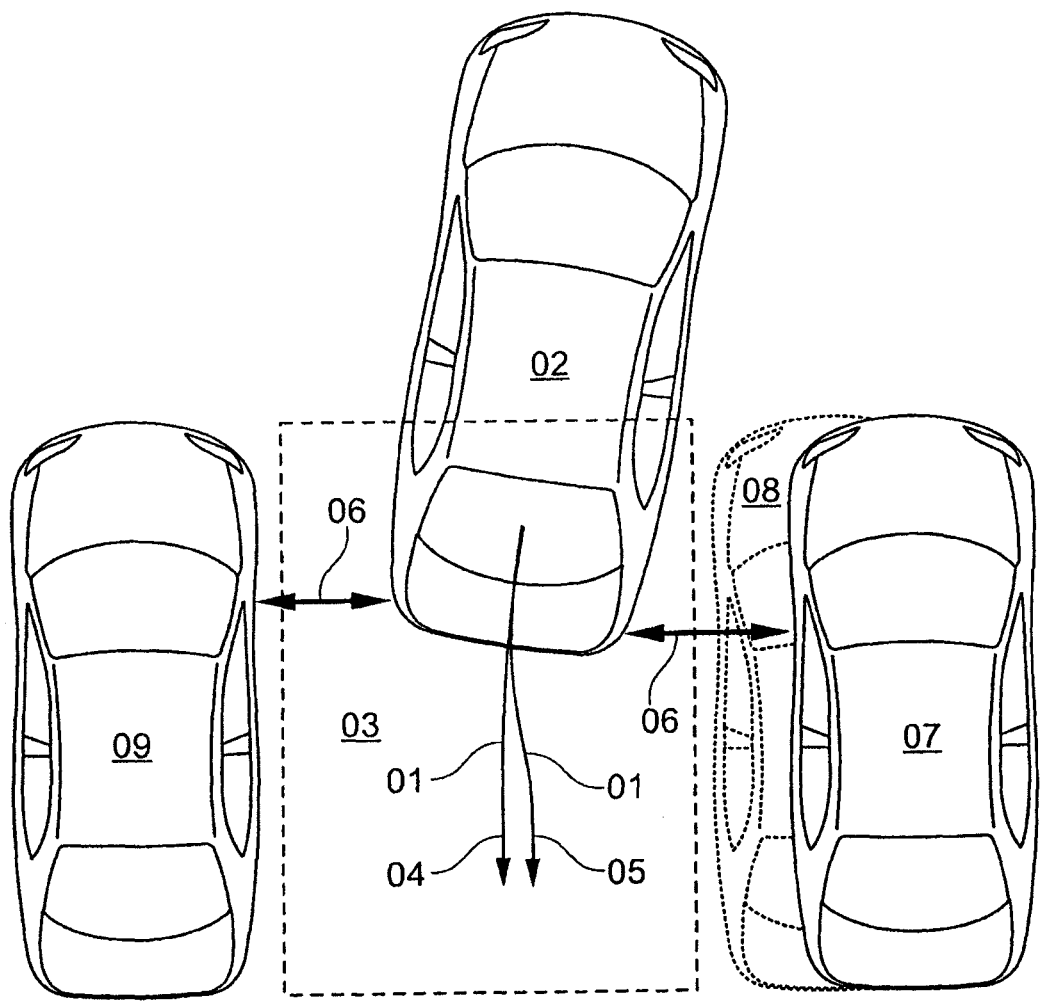
FIG. 1 shows a schematic illustration of a first parking process.

A first exemplary embodiment of a method according to the invention is explained below with reference to FIG. 1. FIG. 1 shows a correction according to the invention of a parking trajectory 01 and therefore of the lateral positioning of a vehicle 02 in a parking space 03 in a right-angled parking situation on the basis of additional lateral ultrasonic sound sensors in the rear bumper of the vehicle 02.

Due to a measurement error during the original parking space measurement before the start of a parking process, a system view has resulted in which an object 07 which bounds the parking space 03 on the right, here another parked vehicle 07, is not located in its actual position but rather in an erroneous position 08. On the basis of the erroneous parking space geometry which was determined from the measurement of the parking space 03 before the start of the parking process and corresponds to the system view, and on the basis of a vehicle position relative to the parking space 03, a parking trajectory 04 has initially been calculated in which the vehicle 02, when steered along the parking trajectory 04 into the parking space 03, would not be positioned centrally as desired but rather off-centre in the parking space 03 due to the measurement error.

In order to correct this, the lateral distance 06 from the objects 09, 07 to the left and right of the vehicle 02 is sensed during the entry into the parking space 03, as illustrated in FIG. 1, and said lateral distance 06 is compared with the distances which are expected on the basis of the originally sensed geometry and the current vehicle position.

The offset is detected and the parking trajectory 01 is correspondingly corrected so that, instead of the parking trajectory 04 which is based on the measurement error and which reflects the erroneous system view before the start of the parking process, the parking trajectory 05 which is adapted to the actual situation is now present, and the vehicle 02 is now moved along said parking trajectory 05 into a final target position in the parking space 03.

Alternatively, the lateral distances 06 can be sensed during the parking process by means of radar sensors which are present for monitoring the blind spot. As a result, no additional costs are incurred for specific sensors or for a specific sensor system.

Figure 2:
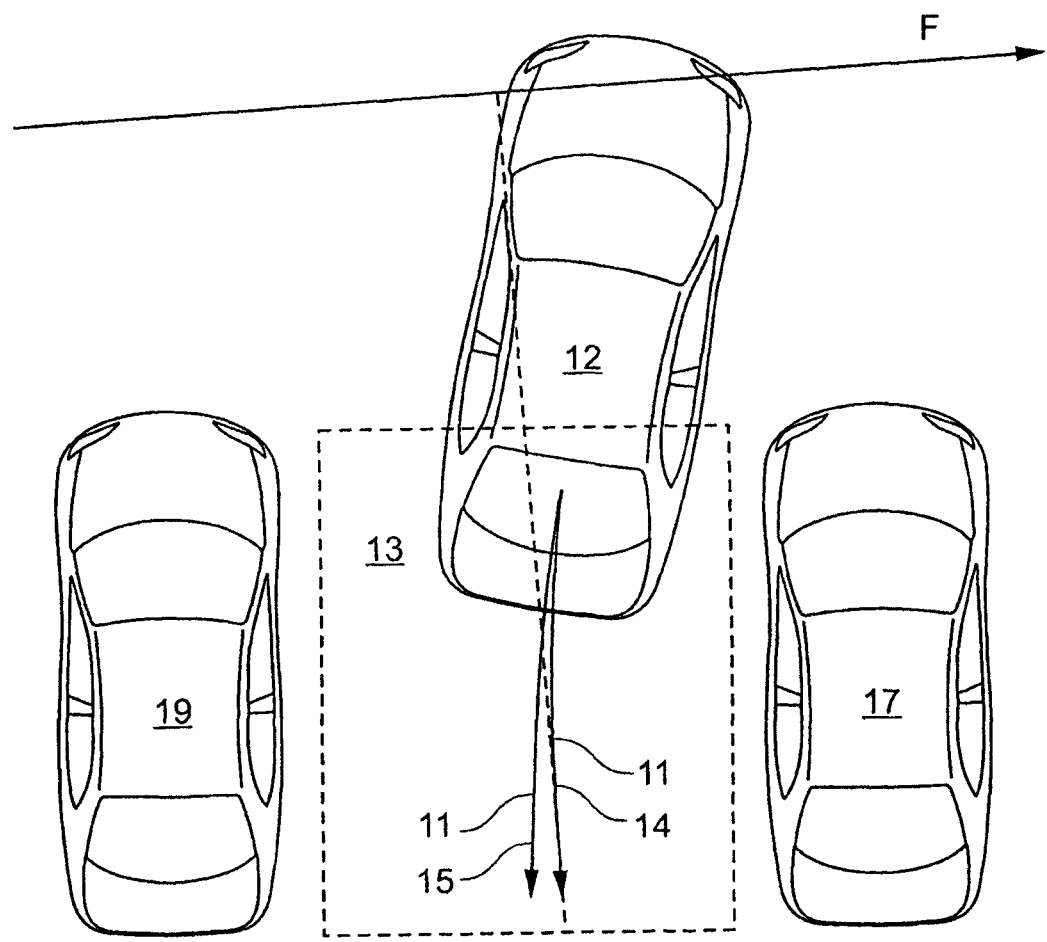
FIG. 2 shows a schematic illustration of a second parking process.

A second exemplary embodiment of a method according to the invention is explained below with reference to FIG. 2. FIG. 2 shows an inventive correction of a parking trajectory 11 and therefore the target orientation of the vehicle 12 in a parking space 13 given a non-right-angled parking situation on the basis of additional lateral ultrasonic sound sensors in the rear bumper of the vehicle 12.

A parking trajectory 14 is also initially calculated here on the basis of a measurement of the parking space before the start of a parking process, and said parking trajectory 14 would lead to an unsatisfactory parking result owing to insufficient measurement of the parking space 13 due to the non-right-angled parking situation.

The determination of the target orientation of the vehicle 12 in a parking space 13 which is not oriented at a right angle to a road which is illustrated schematically by arrow F is difficult since as a rule sufficient information is not available from the determination of the parking space geometry due, for example, to shadowing of the objects 17, 19 which bound the parking space laterally. The target orientation has hitherto typically been defined at a right angle to the road F of the vehicle 12 as the latter travels past the parking space 13.

For this reason, according to the invention the profile of the objects 19, 17 to the left and right of the vehicle 12 is sensed during the entry into the parking space 13. If it is possible to detect on the basis of the profile that the parking space 13 has an orientation or geometry which deviates from the original definition, the parking trajectory 11 is correspondingly corrected so that, instead of the original parking trajectory 14, a parking trajectory 15 which is adapted to the actual situation is now present, and the vehicle 12 is moved along said parking trajectory 15 into its final target position in the parking space 13.

One possible way of detecting the orientation of the parking space 13 may be here to represent the profile of the two lateral objects 17, 19 as a straight line.

If both straight lines extend approximately in parallel, the mean value of the two straight lines is adopted as the orientation of the parking space 13.

If both straight lines do not extend sufficiently in parallel but have the same orientation with respect to the original target orientation, the straight line which deviates the least from the original target orientation is adopted as the orientation of the parking space 13.

If both straight lines do not extend sufficiently in parallel and are differently oriented with respect to the original target orientation, either a mean value of both straight lines can be adopted as the orientation of the parking space 13 or the original target orientation can be retained.

A significant advantage of this second exemplary embodiment is that as a result it is possible not only to park in parking spaces 13 which are oriented virtually at a right angle to the carriageway or to a road F but also in what are referred to as oblique parking spaces.

An exemplary embodiment of a method according to the invention provides correction of the parking trajectory on the basis of parking space markings which are detected by a reversing camera.

Parking space markings can be sensed by a reversing camera and detected by means of suitable image processing. In this context, the position and orientation of the parking space markings are determined.

Since these parking space markings are generally located in the edge region of the camera image before the start of the parking process, determination only becomes appropriate during the parking process but at least the accuracy of the determination improves if the parking space marking migrates in the direction of the centre of the image during the parking process. This applies in particular to adverse light conditions and/or contrast conditions.

It is also conceivable that a profile of the kerb is determined instead of a parking space marking.

Figure 3:
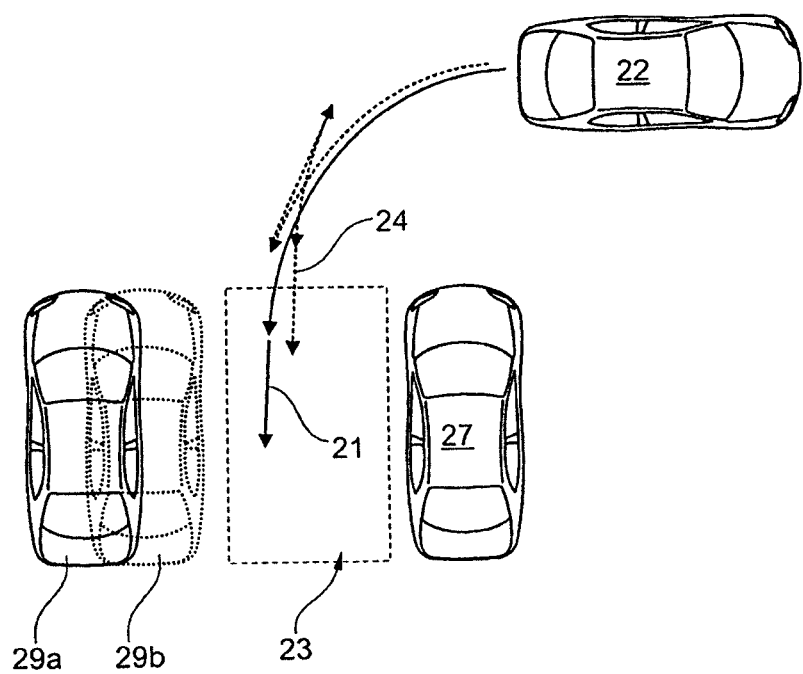
FIG. 3 shows a schematic illustration of a third parking process with parallel deviation of a real lateral object from the measured object.

A third exemplary embodiment of a method according to the invention will be explained below with reference to FIG. 3. This figure shows an inventive correction of a parking trajectory 21, and therefore for the purpose of driving a vehicle 22 into a parking space 23 in a parking situation in which the real position of a vehicle 29*b* deviates from the measured position (vehicle 29*a*) through parallel displacement. As a result of evaluation of the distance data of laterally mounted ultrasonic sound sensors in the rear bumper of the vehicle 22, the parking trajectory 21 which is firstly determined on the basis of the measured values can be recalculated here in the direction of the new parking trajectory 24 (represented by dashed lines) taking into account the lateral distance values from the real position of the vehicle 29*b*, said lateral distance values having been measured during the parking process.

Figure 4:
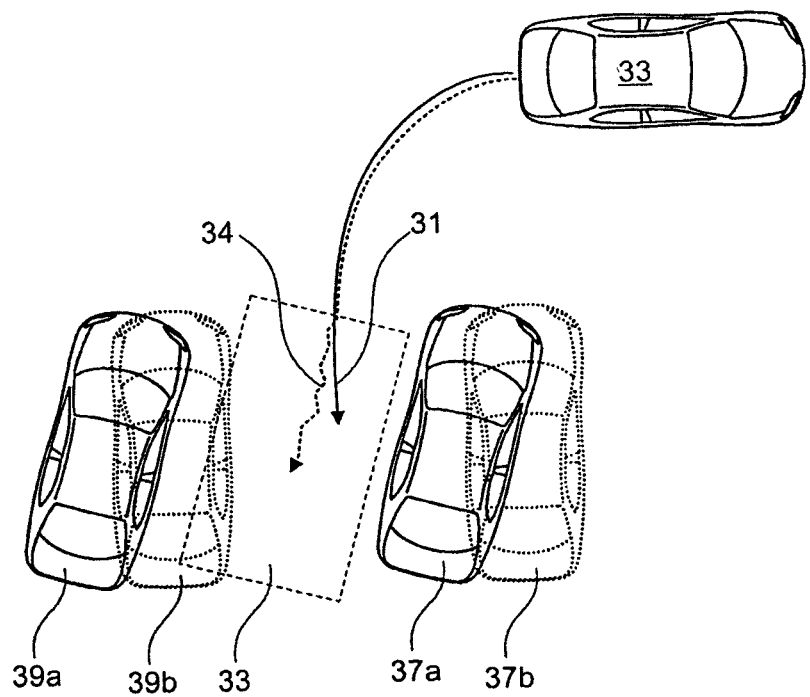
FIG. 4 shows a schematic illustration of a fourth parking process with a directional offset of one or both real lateral objects.

In a fourth exemplary embodiment of a method according to the invention, an explanation is given on the basis of FIG. 4 as to how, in the case of a directional offset of the initially measured straight line of a vehicle 39*b* (or vehicle 37*b*) with respect to a real vehicle 39*a* (or vehicle 37*a*), the target angle of the parking trajectory 31 is corrected with respect to a new parking trajectory 34 (represented by dashed lines) using the distance values of the ultrasonic sound sensors on the parking vehicle 33, said sensors being mounted laterally on the rear bumper.

In summary, the invention provides that the geometry of the parking space is determined by means of a suitable sensor system during the parking process and compared with the geometry determined before the start of the parking process. If the two geometries differ from one another, the deviation which is present is evaluated. This permits correction of the parking trajectory on the basis of current sensor data during the parking process.

If the difference is small and is due, for example, to the respective system-conditioned variation, the original geometry is retained.

If the geometry which is determined during the parking process differs significantly from the original geometry and this difference is relevant for the parking result, the parking trajectory is redefined or corrected on the basis of the currently determined geometry.

By means of the invention, information which is firstly determined during the parking process and in that case determined with improved accuracy can be converted into a usable form and therefore contribute to improving the parking result, in particular in difficult situations, and therefore to ultimately increasing the usability and customer satisfaction of a parking system.

A suitable sensor system here is, in addition to the ultrasonic sound sensors already installed in the vehicle, an existing camera, for example a reversing camera or radar sensors, for example a sensor system for monitoring the blind spot. It is also conceivable to install a sensor system which is provided especially for redetermining the parking space geometry during the parking process, for example additional lateral ultrasonic sensors in the rear region of the vehicle.

Basically it is conceivable, in addition to the specified measures, to have the driver perform verification and confirmation or correction of the target parking position and/or target orientation in the parking space, for example by means of a representation of the parking situation on a display. This may be done, for example, by superimposing a target parking position determined by the system on an image of the reversing camera, for example.

The invention claimed is:

1. A method for assisting a driver of a vehicle when parking in a parking space the method comprising:
measuring a possible parking space;
calculating a parking trajectory on the basis of a current parking space geometry which is determined from the measurement of the parking space, and on the basis of a vehicle position relative to the parking space; and
subsequently carrying out a parking process during which the vehicle is steered along the parking trajectory into the parking space; and
continuously determining the current parking space geometry during the parking process using current sensor data acquired by a sensor system for measuring the parking space, and comparing the current parking space geometry with a previous parking space geometry determined before the start of the parking process,
wherein, when the previous and current parking space geometries differ from one another, a deviation which is present is evaluated and the parking trajectory is corrected and/or re-calculated, and
wherein the comparison between the previous parking space geometry determined before the parking process and the current parking space geometry determined during the parking process is carried out by sensing, during the entry into the parking space, the lateral distance, to the left and right of the vehicle, from objects which bound the parking space and by comparing said lateral distance with the distances which are expected on the basis of the originally sensed parking space geometry and the current vehicle position.

2. The method according to claim 1, wherein when the difference between the previous parking space geometry determined before the parking process and the current parking space geometry is small, the original parking trajectory is retained, and when the previous parking space geometry differs significantly from the current parking space geometry and this difference is relevant for the parking result, the parking trajectory is re-defined or corrected on the basis of the parking space geometry currently determined during the parking process.

3. The method according to claim 1, wherein the distance from objects which bound the parking space is monitored during the parking process.

4. The method according to claim 1, wherein, if it can be detected on the basis of the profile that the parking space has an orientation which differs from the parking space geometry determined before the parking process, the parking trajectory is correspondingly corrected.

5. The method according to claim 4, wherein, in order to detect the orientation of the parking space, the profile of the two lateral objects is represented in each case as a straight line.

6. The method according to claim 5, wherein when both straight lines extend approximately in parallel, the mean value of the two straight lines is adopted as the orientation of the parking space.

7. The method according to claim 5, wherein when both straight lines do not extend sufficiently in parallel but have the same orientation with respect to the original target orientation, the straight line which differs the least from the original target orientation is adopted as the orientation of the parking space.

8. The method according to claim 5, wherein in the event of a deviation of the profile of the measured straight lines from the real straight lines, lateral distance data are used to correct the parking trajectory during the parking process.

9. The method according to claim 8, wherein in the event of parallel displacement of the straight lines, the parking trajectory is corrected by corresponding parallel displacement.

10. The method according to claim 8, wherein in the event of a directional offset of the straight lines, the target angle of the parking trajectory is corrected.

11. The method according to claim 5, wherein when both straight lines do not extend sufficiently in parallel and are oriented differently with respect to the original target orientation, a mean value of the two straight lines is adopted as the orientation of the parking space.

12. The method according to claim 5, wherein when both straight lines do not extend sufficiently in parallel and are oriented differently with respect to the original target orientation, the original target orientation is retained.

13. The method according to claim 1, wherein, in order to determine the current parking space geometry during the parking process, a measuring device is provided which is primarily provided for assisting the driver of the vehicle in a situation other than during the parking process.

14. The method according to claim 1, wherein, in order to determine the current parking space geometry during the parking process, a measuring device is provided which is provided specially for assisting the driver of the vehicle during the parking process.

15. The method according to claim 14, wherein the measuring device comprises ultrasonic sound sensors.

16. The method according to claim 14, wherein the measuring device comprises a camera.

17. The method according to claim 14, wherein the measuring device comprises radar sensors.

18. The method according to claim 1, wherein, in order to determine the current and previous parking space geometries before and/or during the parking process, a position and an orientation of parking space markings are sensed and determined.

19. The method according to claim 1, wherein, in order to determine the current and previous parking space geometries before and/or during the parking process, a profile of the curb is sensed and determined.

20. The method according to claim 1, wherein there is additionally provision for the target parking position and/or orientation in the parking space to be verified and confirmed or corrected by the driver.

21. A driver assistance device, the device comprising:
a sensor system for measuring a parking space before and during a parking process, wherein current sensor data obtained by the sensor system is used to continuously determine a current parking space geometry during the parking process;
a microprocessor which is connected to the sensor system and has associated storage, the microprocessor being configured to:
calculate and correct a parking trajectory on the basis of the current parking space geometry determined during the parking process and a previous parking space geometry determined before the parking process, wherein the parking space geometries are determined from the measurement of the parking space before and during the parking process, and on the basis of a vehicle position relative to the parking space,
compare the current parking space geometry with the previous parking space geometry, and when the two parking space geometries differ from one another, a difference which is present is evaluated and the parking trajectory is corrected and/or recalculated,
wherein the comparison between the previous parking space geometry determined before the parking process and the current parking space geometry determined during the parking process is carried out by sensing, during the entry into the parking space, the lateral distance, to the left and right of the vehicle, from objects which bound the parking space and by comparing said lateral distance with the distances which are expected on the basis of the originally sensed parking space geometry and the current vehicle position; and
carry out the parking process during which the vehicle is steered along the parking trajectory into the parking space.

22. The driver assistance device according to claim 21, wherein the driver assistance device permits one selected from a group consisting of guided parking, semi-automatic parking, or fully automatic parking of a vehicle along the parking trajectory into the parking space.

23. A computer program product stored on a non-transitory computer-readable storage medium, comprising computer-readable program code which, when the computer program product is executed on a microprocessor with associated storage means or on a computer, cause the latter to carry out a method comprising:
measuring a possible parking space;
calculating a parking trajectory on the basis of a current parking space geometry which is determined from the measurement of the parking space, and on the basis of a vehicle position relative to the parking space;
subsequently carrying out a parking process during which the vehicle is steered along the parking trajectory into the parking space; and
continuously determining the current parking space geometry during the parking process using current sensor data acquired by a sensor system for measuring the parking space, and comparing the current parking space geometry with a previous parking space geometry determined before the start of the parking process,
wherein the comparison between the previous parking space geometry determined before the parking process and the current parking space geometry determined during the parking process is carried out by sensing, during the entry into the parking space, the lateral distance, to the left and right of the vehicle, from objects which bound the parking space and by comparing said lateral distance with the distances which are expected on the basis of the originally sensed parking space geometry and the current vehicle position, and
wherein, when the previous and current parking space geometries differ from one another, a deviation which is present is evaluated and the parking trajectory is corrected and/or re-calculated.

* * * * *